United States Patent [19]
Kihara et al.

[11] Patent Number: 5,951,710
[45] Date of Patent: Sep. 14, 1999

[54] METHOD AND APPARATUS FOR CHECKING COMPRESSED DATA ERRORS

[75] Inventors: Nobuyuki Kihara, Tokyo; Hiraku Inoue, Kanagawa, both of Japan

[73] Assignee: Sony Corporation, Tokyo, Japan

[21] Appl. No.: 08/987,302

[22] Filed: Dec. 9, 1997

[30] Foreign Application Priority Data

Dec. 16, 1996 [JP] Japan .................................. 8-352527

[51] Int. Cl.$^6$ .................................................. G11C 29/00
[52] U.S. Cl. ........................ 714/766; 714/800; 714/701; 369/32; 369/47; 369/50; 369/60; 364/130
[58] Field of Search ............................... 371/40.14, 49.1, 371/2.1; 369/59, 50, 47, 60, 275.3, 48, 124, 32; 395/200.77, 888; 364/130

[56] References Cited

U.S. PATENT DOCUMENTS

| | | | |
|---|---|---|---|
| 5,453,967 | 9/1995 | Aramaki et al. | 369/59 |
| 5,473,590 | 12/1995 | Yokota et al. | 369/59 |
| 5,491,592 | 2/1996 | Aramaki et al. | 360/59 |
| 5,493,558 | 2/1996 | Kihara | 369/275.2 |
| 5,504,728 | 4/1996 | Yokota et al. | 369/58 |
| 5,544,165 | 8/1996 | Yokota et al. | 369/32 |
| 5,553,055 | 9/1996 | Yokota et al. | 369/124 |
| 5,619,483 | 4/1997 | Yokota et al. | 369/47 |
| 5,625,611 | 4/1997 | Yokota et al. | 369/47 |
| 5,633,841 | 5/1997 | Yokota et al. | 369/32 |
| 5,668,789 | 9/1997 | Yokota et al. | 369/47 |
| 5,703,854 | 12/1997 | Kuroda et al. | 369/50 |
| 5,706,262 | 1/1998 | Yokota et al. | 369/32 |
| 5,761,173 | 6/1998 | Inoue | 369/83 |
| 5,768,236 | 6/1998 | Kihara | 369/60 |
| 5,831,954 | 11/1998 | Sako et al. | 369/59 |
| 5,848,032 | 12/1998 | Yokota et al. | 369/32 |

*Primary Examiner*—William Grant
*Assistant Examiner*—McDieunel Marc
*Attorney, Agent, or Firm*—Limbach & Limbach LLP; Seong-Kun Oh, Esq.

[57] ABSTRACT

Double error correction is attempted on the data for which error detection is once performed on compressed data both in the error detecting circuit and in the error correcting circuit after it is read out in sectors from the target disc medium and the reliability of the data recorded on the disc medium is judged according to the pointer C2PO indicating that the error cannot be corrected even with the double correction processing, whereby a disc playback apparatus can be provided which is able to judge the state of data errors without executing the expanding processing of the compressed data.

11 Claims, 6 Drawing Sheets

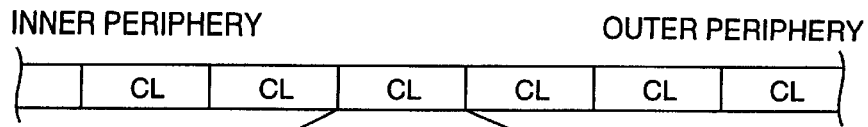
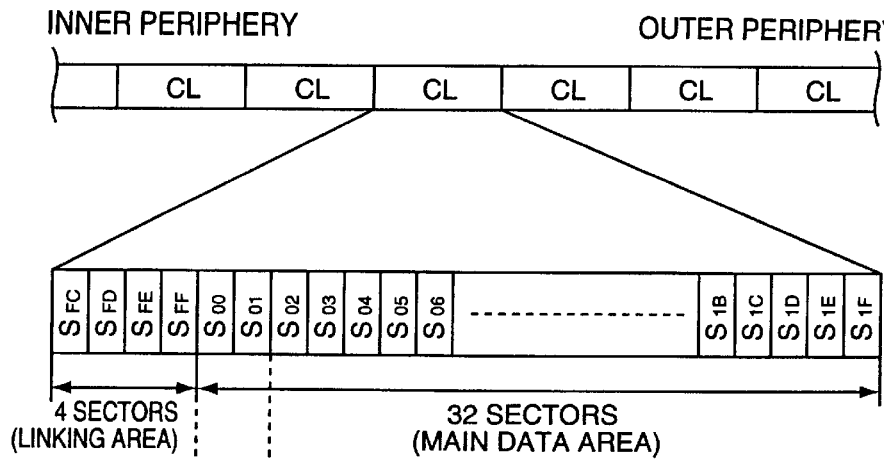
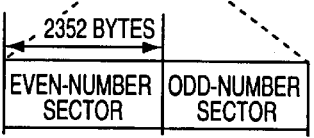
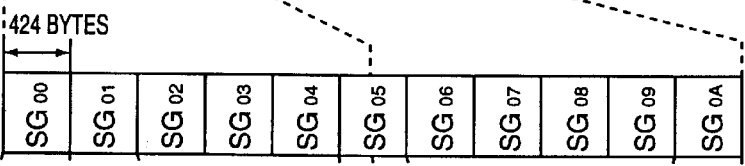
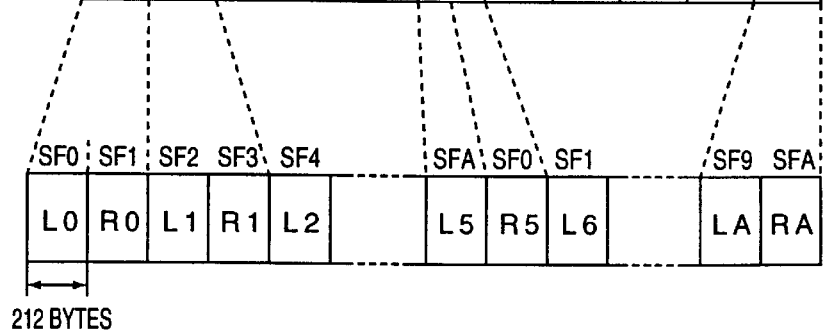

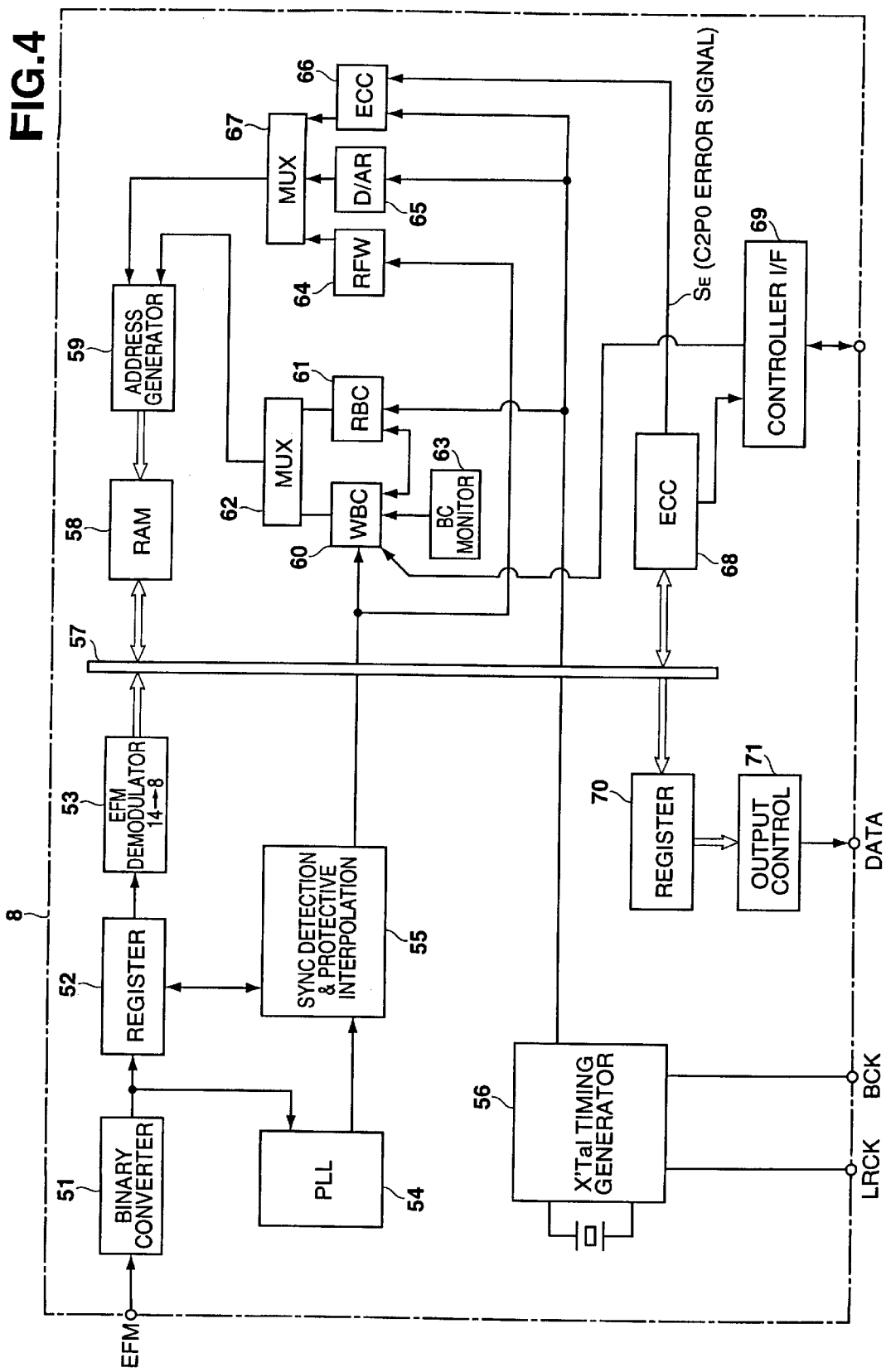

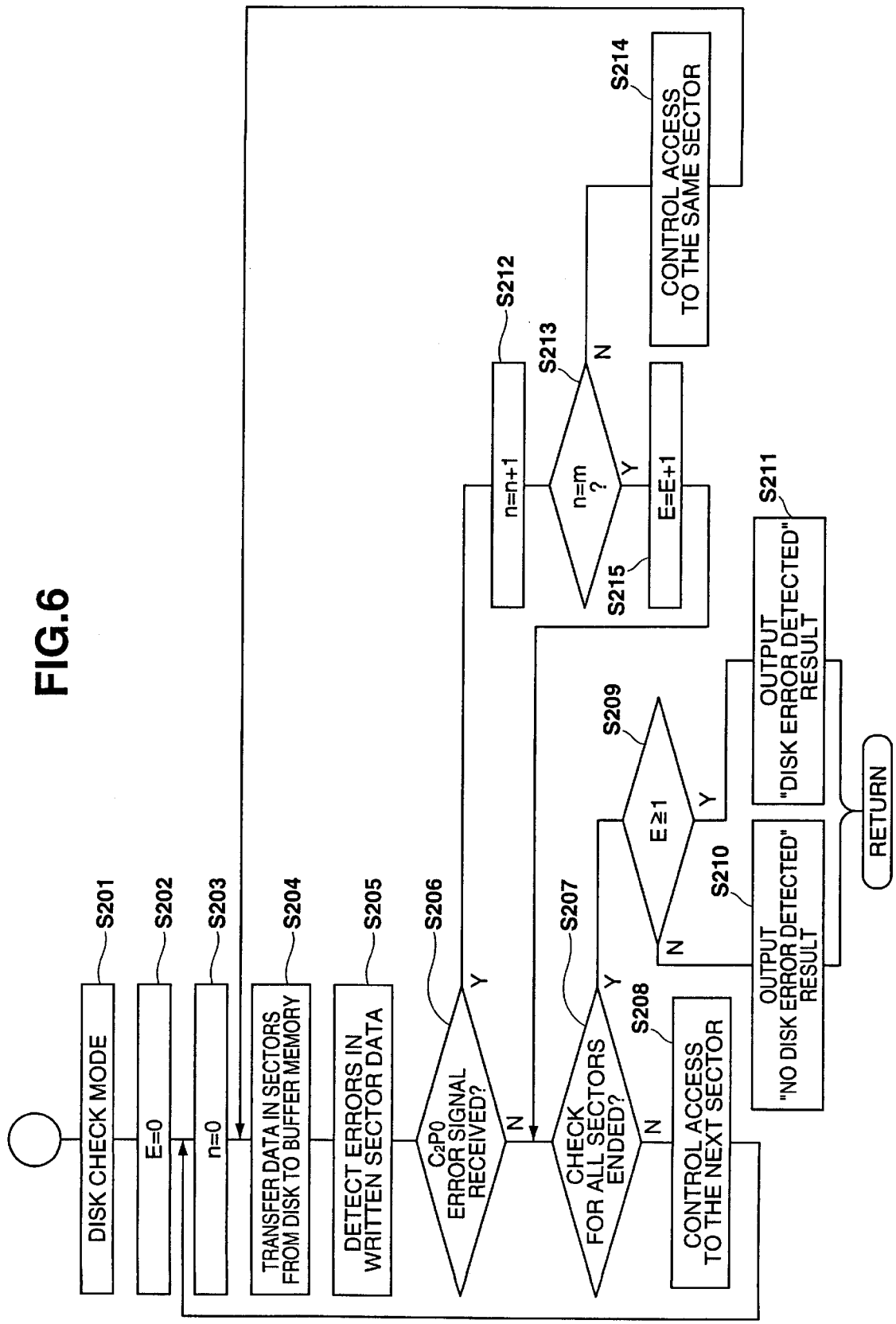

METHOD AND APPARATUS FOR CHECKING COMPRESSED DATA ERRORS

BACKGROUND OF THE INVENTION

The present invention relates to method and apparatus for playing back signals corresponding to, for example, a recording medium on which digital data is recorded.

Many recording and playback apparatuses have been developed corresponding to various types of recording media. Especially, such an apparatus well known by a trade name "mini-disc system" is very popular now with which users can record audio data, and otherwise manipulate data freely.

For example, in such mini-disc system mentioned above, in order to check whether or not audio data is recorded properly on the disc, the user actually listens to the played back audio signals recorded on the disc and judges that the data is recorded properly if the continuity of the played back sound is not lost.

In such data checking approach, however, the user often fails to catch abnormal audio signals during the playback, so the user's judgment is not always reliable.

Furthermore, when checking every data recorded on a disc, the user must keep listening to the played back audio signals for 60 to 70 minutes in maximum corresponding to the possible recording time of the disc. Even when audio data recorded on a mini-disc in programs is checked in programs, it will take several minutes generally to finish the check. In other words, much time is needed to finish the check and it is very ineffective.

SUMMARY OF THE INVENTION

Under such circumstances, it is an object of the present invention to provide a method and apparatus for checking audio data recorded on a disc, and so on with a higher reliability and within a short time efficiently.

In order to achieve the above objects, the apparatus according to the present invention used for checking whether or not compressed data is recorded properly on a recording medium comprises:

a key for indicating the error checking mode;

a head for reading out compressed data recorded on the recording medium; and an error detector that detects errors according to an error correction code added to the compressed data read out from the head, wherein when the error checking mode is instructed by the key, the head reads out the compressed data and the error detector executes an error detecting operation, so that whether or not the compressed data is recorded properly on the recording medium is judged according to information of the detected error from the error detector to execute error checking for as-compressed data.

BRIEF DESCRIPTION OF THE DRAWINGS

FIG. 3A is a schematic view of the data recorded in clusters on a magneto-optical disc;

FIG. 3B is a view of a data structure showing that one cluster comprises 36 sectors with 4 sectors of linking data and 32 sectors of main data;

FIG. 3C is a view of a data structure showing that one sound frame is formed with two sectors that make a pair;

FIG. 3D is a view of a data structure showing that one sound frame comprises 11 sound groups;

FIG. 3E is a view of a data structure showing that one sound group comprises right channel data and left channel data;

FIG. 4 is a block diagram showing the configuration of the major part of the EFM & ACIRC decoder shown in FIG. 2;

FIG. 6 is a flow chart explaining a processing in the second embodiment in the error check mode.

DESCRIPTION OF THE PREFERRED EMBODIMENTS

Hereunder, an embodiment of the playback apparatus of the present invention will be described.

In this embodiment, a magneto-optical disc (mini-disc) is taken as a recording medium and a reading & playback apparatus is taken as that corresponding to this recording medium. The embodiment will be explained in the following order.

<1. Configuration of the reading & playback apparatus>
<2. Cluster format>
<3. Configuration of the encoder & decoder>
<4. Disk check mode operation>
  (4.a. First example)
  (4.b. Second example)

<1. Configuration of the reading & playback apparatus>

At first, the configuration of the reading & playback apparatus for mini-discs will be explained with reference to FIGS. 1 and 2.

Figure 1:
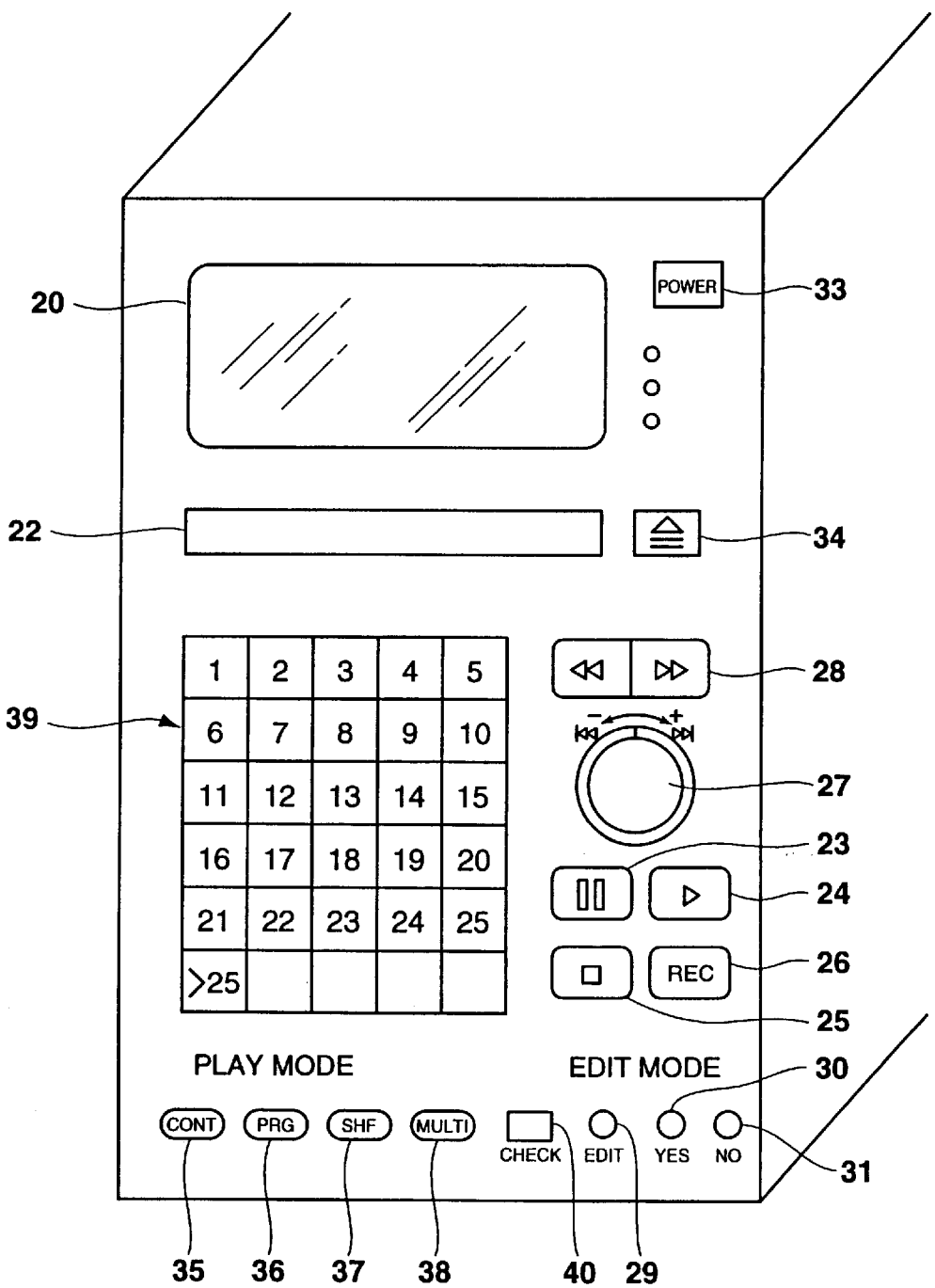
FIG. 1 is an external view of a magneto-optical disc recording & playback apparatus to which the present invention applies.

FIG. 1 is an external view of the reading & playback apparatus.

On the front panel of the reading & playback apparatus is formed a display unit 20 which can be a liquid crystal display, for example. This display unit 20 displays the operation status, track number, recording or playback time, editing operation status, playback mode, and so on of the disc on/from which data is recorded/read. The mini-disc system that can record character data on a disc can also display entered character data as well as character data read from the disc.

In addition, in this embodiment, the display unit 20 can also display check results obtained in the disc check mode (to be explained later).

The POWER key 33 is provided to turn on/off the power supply of the reading & playback apparatus.

On the front panel of the reading & playback apparatus is also provided a disc loader 22 used to insert or eject a disc in or from the reading & playback apparatus itself according to the operation of the EJECT key 34.

On the front panel of the reading & playback apparatus is also provided various means of recording/playback operations. The means include for example, the PLAYBACK key 24, the PAUSE key 23, the STOP key 25, the RECORD key 26, as well as the AMS (Auto Music Sensor) operation dial 27 for executing an access operation (hereinafter referred to as the jog dial), the SEARCH key 28 for executing a fast playback operation. The keys mentioned above are basic ones related to recording and playback operations of audio signals.

The jog dial 27, when turned, functions as an operation device for instructing the AMS operation. In a character input mode (disc or program name input mode), which is one of the edit mode, however, turning of the jog dial 27 scrolls character codes forward or backward for selecting characters.

The center part of the jog dial 27 can be pushed to execute further operations. When the center part is pushed, the jog dial 27 functions as the ENTER key in the disc name input, program name input, program set-up, and multiple access set-up modes. The pushing operation of the jog dial 27 may be made to also serve for executing a playback operation just like the PLAYBACK key 24.

In addition to those operation means, the reading & playback apparatus is also provided with number keys 39.

The number keys 39 are, for example, keys with numbers from "1" to "25" and a ">25" key used to enter numbers 26 and over.

The number keys 39 can be used to select a playback program number directly and select a track number in the program playback or multiple access playback mode.

The EDIT key 29, the ENTER key 30, and the CANCEL key 31 are also provided for operations in the edit modes.

The EDIT key 29 is used to call and end various edit modes. The ENTER key 30 and the CANCEL key 31 are used for operations during editing. For example, the ENTER key 30 is used to enter an operation and the CANCEL key 31 is used to cancel an operation.

Edit modes include the program name input mode used to input characters such as a program name to each program, the disc name input mode used to input characters such as a disc name to a disc, the name erase mode used to erase registered characters, the divide mode used to divide one program into a plurality of programs, the combine mode used to combine a plurality of programs into one program, and the erase mode used to erase programs.

The reading & playback apparatus is also provided with the following operation keys used in the playback modes: the CONTINUOUS PLAYBACK key 35, the PROGRAM key 36, the SHUFFLE key 37, and the MULTIPLE ACCESS key 38.

Operating any of those keys, the continuous playback mode, the program playback mode, the shuffle playback mode, or the multiple access playback mode can be set as a playback mode.

In this embodiment, a DISK CHECK key 40 is also provided. For example, when this DISK CHECK key 40 is operated in combination with a disc playback operation, the operation mode is changed to the disc check mode. The disc check mode mentioned here includes a mode in which it can be judged whether or not data is recorded properly on the target disc on the device side according to the error detection result of the error correction processing for the played back data from the disc. And, the judgment result is displayed on the display unit 20, for example. Such a disc check is made to be done both for every data and in tracks according to specified operation.

When a disc is checked for recorded data in this disc check mode, the data is checked before it is expanded, to be explained later, so that the checking time is shorter than the ordinary playback time, which is needed to output audio signals finally. In this check mode, it is preferable that played back audio signals are not output for the reasons to be explained later.

Although those operation means are arranged on the front panel of the reading & playback apparatus in this embodiment, they may be provided on, for example, a remote commander using an infrared beam with which the reading & playback apparatus can be operated.

Hereunder, the internal configuration of the mini-disc reading & playback apparatus as shown in FIG. 1 will be explained with reference to FIG. 2.

The magneto-optical disc 1 on which audio data is recorded is driven and rotated by a spindle motor 2. When recording or playing back data, an optical head 3 emits a laser beam on the magneto-optical disc 1.

When recording, the optical head 3 outputs a high level laser beam to heat the recording tracks up to the Curie Temperature. When playing back, the optical head 3 outputs a comparatively low level laser beam to detect data from the reflected light making use of the magnetic kerr effect.

For such laser outputs, therefore, the optical head 3 is provided with a laser diode used as a laser output means, an optical system comprising a polarizing beam splitter, objective lenses, etc., and a detector for detecting reflected lights. The objective lens 3a is held by a two-axis mechanism 4 so as to be displaced both in the radial direction of the disc and in the direction the lens 3a comes in contact with or is separated from the disc.

In addition, a magnetic head 6a is arranged in a position facing the optical head 3 across the disc 1. The magnetic head 6a impresses a magnetic field modulated by supplied data to the magnetic disc 1.

The whole optical head 3 and the magnetic head 6a can be moved by the threading mechanism 5 in the radial direction of the disc.

The information detected by the optical head 3 from the disc 1 in a playback operation is supplied to the RF amplifier 7. The RF amplifier 7 extracts the played back RF signal, the tracking error signal TE, the focus error signal FE, the group information (absolute positional information recorded as a pre-group (wobbling group) in the magnetooptical disc 1) GFM, and so on from the supplied information through arithmetic operations.

The extracted RF signal is supplied to the EFM/ACIRC encoder & decoder 8. Furthermore, the tracking error signal TE and the focus error signal FE are supplied to the servo circuit 9. The group information GFM is supplied to the address decoder 10.

The servo circuit 9 generates various servo driving signals according to the tracking error signal TE and the focus error signal FE supplied, as well as according to the track jump command and the access command from the system controller 11 comprising a microcomputer, and the rotation speed detected information from the spindle motor 2 to control the two-axis mechanism 4 and the threading mechanism 5 to control both focusing and tracking, as well as to control the spindle motor 2 at a fixed linear velocity (CLV: Control Linear Velocity).

The address decoder 10 extracts address information by decoding supplied group information GFM. This address information is supplied to the system controller 11 and used to control various items.

The played back RF signal is decoded with a processing such as EFM (Eight-Fourteen demodulation Coding) demodulation or ACIRC (Advanced Cross Interleave Reed Solomon Coding) decoding in the EFM/ACIRC encoder & decoder 8. At this time, address and sub-code data are also extracted and supplied to the system controller 11.

Sector data decoded with the processing such as EFM modulation and ACIRC decoding in the EFM/ACIRC encoder & decoder 8 is written in the buffer memory 13 once by the memory controller 12. The speed of the optical head 3 to read data from the disc 1 and transfer played back data to the buffer memory 13 is 1.41 Mbit/sec. Usually, this read/transfer operation is executed intermittently.

Data written in the buffer memory 13 is read at a timing so that playback data is transferred at 0.3 Mbit/sec and supplied to the compressed audio data encoder & decoder 14. Then, the data is expanded and decoded through the processing for the compressed audio data so that it can be played back as 44.1 kHz sampling and 16-bit quantized digital audio signals.

These digital audio signals are adjusted as to equalizing, reverberation, gain and so on in, for example, the digital signal processor 21, then converted to analog signals in the D/A (Digital to Analog) converter 15 and supplied from the output terminal 16 to a specified amplifier so as to be output as played back signals. For example, they are output as analog audio signals of both right and left channels.

The digital signal processing circuit 21 is formed with, for example, a so-called DSP (Digital Signal Processor) and used for various processings. For example, the circuit 21 can carry out fade-in and fade-out processings by changing the output sound volume level gradually in addition to the equalizing processing carried out in the sound set-up in various modes.

Such processor may also be provided in a stage following the D/A converter 15 so that analog processing is carried out for the signals.

When recording data on the magneto-optical disc 1, signals supplied to the input terminal 17 are converted by the A/D (Analog to Digital) converter 18 to digital data, then supplied to the compressed audio data encoder & decoder 14 to be compressed and encoded into audio signals.

A digital interface unit, although unillustrated, may also be of course provided to input/output digital audio data.

Recorded data compressed by the encoder & decoder 14 is written once by the memory controller 20 in the buffer memory 13, then read out at a specified timing and transferred to the EFM/ACIRC encoder & decoder 8. The data is then encoded with a processing such as CIRC encoding or EFM demodulation in the EFM/ACIRC encoder & decoder 8 and supplied to the magnetic head driving circuit 6.

The magnetic head driving circuit 6 supplies the magnetic head driving signals to the magnetic head 6a according to encoded recorded data. In other words, the reading & playback apparatus drives the magnetic head 6a to impress a magnetic field with a polarity of N or S on the magneto-optical disc 1. At this time, the system controller 11 supplies control signals to the optical head 3 so that the optical head 3 outputs a laser beam of the recording level.

The operation unit 19 indicates a part to be operated by the user. The part is equivalent to an operation key or a dial explained with reference to FIG. 1. Operation information given by the key or dial is supplied to the system controller 11, which then controls the target item according to the operation information.

The display unit 20 is provided on the case of the reading & playback apparatus as shown in FIG. 1 and controlled by the system controller 11.

The system controller 11 is taken as a microcomputer provided with a CPU, a program ROM, a RAM, and an interface, and so on. In this embodiment, the system controller 11 is formed so as to be able to realize the above-mentioned disc check mode function.

<2. Cluster format>

First, the unit of cluster will be explained below.

FIGS. 3A to 3E show the format of clusters, which is the unit of recording in the mini-disc system.

As shown in FIG. 3A, clusters CLs are formed continuously as recording tracks in the mini-disc system. One cluster is the minimum unit of recording. One cluster is the minimum unit of recording. One cluster is equivalent to 2 to 3-round tracks, although it depends on the difference between inner and outer periphery lengths.

As shown in FIG. 3B, one cluster CL comprises a linking area of 4-sectors as sectors $S_{FC}$ to $S_{FF}$ and a main data area of 32-sectors shown as sectors $S_{00}$ to $S_{1F}$.

One sector is a data unit comprising 2352 bytes.

The four sectors of $S_{FC}$ to $S_{FF}$ are used for recording sub-data or used as a linking area. TOC data, audio data, and so on are recorded in the main data area comprising 32 sectors.

An address is recorded in each sector.

As shown in FIG. 3C, a sector is further divided into sound groups. Two sectors, which makes a pair, are divided into 11 sound groups.

As shown in FIG. 3D, the consecutive two sectors, an even number sector such as sector $S_{00}$ and an odd number sector such as sector $S_{01}$, contain sound groups $SG_{00}$ to $SG_{0A}$. One sound group comprises 424 bytes with volume of audio data equivalent to 11.61 msec.

In one sound group SG data is recorded so that it is divided into right channel data and left channel data. For example, a sound group $SG_{00}$ comprises L channel data L0 and right channel data R0. A sound group $SG_{01}$ comprises L channel data L1 and R channel data R1.

The area of 212 bytes used for an area of right or left channel data is called as a sound frame.

<3. Configuration of the encoder & decoder>

Figure 2:
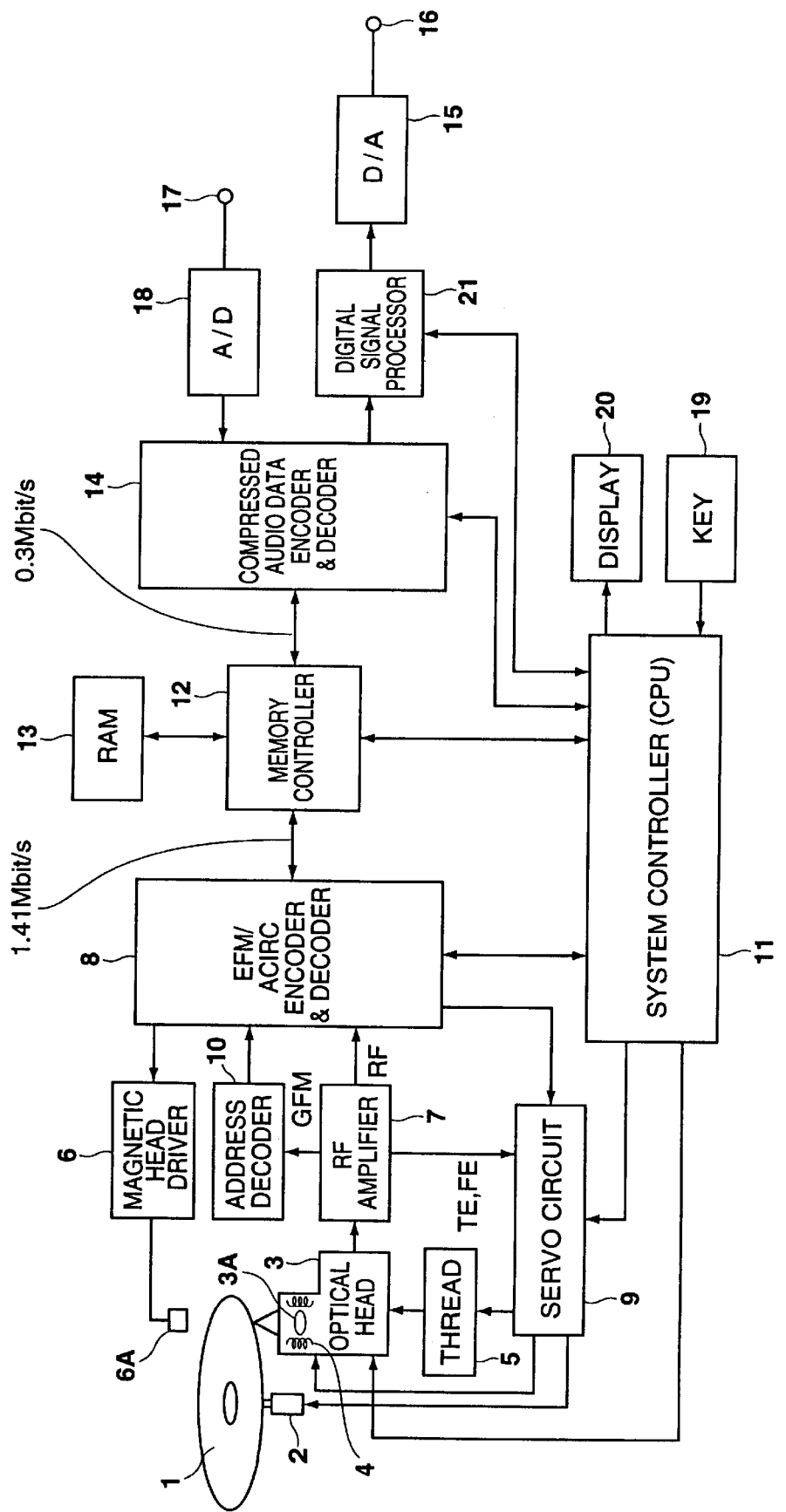
FIG. 2 is a block diagram showing an internal configuration of a magneto-optical disc recording & playback apparatus to which the present invention applies.

FIG. 4 is a block diagram showing the configuration of the major part of the decoder in the EFM/ACIRC encoder & decoder 8 shown in FIG. 2. The decoder outputs data after carrying out an EFM demodulation and an ACIRC (Advanced Interleave +CIRC) decoding for the data.

The played back RF signal output from the RF amplifier 7 is converted to binary signals in the binary converter 51, then supplied to the EFM demodulator 53 via the register 52 to be EFM-demodulated. In other words, the RF signal is subjected to an 8–14 conversion.

The output of the binary converter 51 is supplied to the PLL circuit 54, which then generates clocks synchronized with the EFM signal.

The sync detector 55 detects the frame sync of the EFM signal. The sync detector 55 also protects windows for detecting the frame sync and interpolates frame sync patterns in preparation for the detection of the same frame sync pattern or the failure of detection of the original frame sync caused by influences of drop out or jitter. In addition, when no frame sync pattern is detected properly for a certain time, the window protection and frame sync interpolation processings are stopped and a processing for Re-Sync is executed.

The register 52 thus functions according to the output of the sync detector 55.

The data demodulated in the EFM demodulator 53 is entered to the RAM 58 via the bus 57.

The address generator 59 generates write and read addresses corresponding to various requests output from the multiplexers 62 and 67.

The outputs from the write base counter 60 and the read base counter 61 are selected by the multiplexer 62 and supplied to the address generator 59.

The outputs of the RAM write request generator 64, the RAM read request generator 65, and the C1 or C2 request generator 66 are selected by the multiplexer 67 and supplied to the address generator 59.

The write base counter 60 and the read base counter 61 count data in frames. The write base counter 60 is used to write EFM-demodulated data in the RAM 58. The write base counter 60 counts the frame sync detected by the sync detector 55.

The RAM write request generator 64 generates write requests corresponding to the frame sync detected by the sync detector 55. In other words, data is written in the RAM 58 according to the clock of the PLL system synchronized with the EFM signal.

The read base counter 61 counts the clocks output from the timing generator 56 that generates stable clocks of a quartz oscillator system. The RAM read request generator 65 and the C1 or C2 request generator 66 also receives clocks from the timing generator 56 and generates request signals corresponding to the clocks. Thus, signals are read out from the RAM 58 according to the stabilized clocks. Although the clocks of the PLL system synchronized with the EFM signal contain hunting in the servo system of the disc rotation, the operation of reading out the data from the RAM 58 according to the stabilized clocks also makes the RAM 58 execute the correction as to the time axis.

However, the time axis correction is restricted by the capacity of the RAM 58. For example, when the difference between the count of the write base counter 60 and the read base counter 61 exceeds +/-5 frames, other data is damaged and playback of the signals cannot be guaranteed. To avoid this, therefore, the base counter monitor 63 monitors the count value, so that when the difference between the count of the write base counter 60 and the read base counter 61 exceeds +/-4 frames, the count value of the read base counter 61 is set in the write base counter 60.

The ECC processor 68 corrects errors of EFM-decoded data stored in the RAM 58. In this embodiment, ACIRC (Advanced Interleave +CIRC) is taken as being used as the error correction code.

As is well known, the error correction that uses the ACIRC is an error correction carried out with C1 and C2 series. The ECC processor 68 detects errors of EFM-decoded data, for example, with the C1 series, so that when an error correction is possible in the C1 series, the error correction is executed in this stage. When the error correction is not possible with the C1 series, errors are detected with the C2 series, and when error correction is judged possible with the C2 series, the error correction is executed. When error correction is judged to be not possible even with the error detection by the C2 series, the EFM-decoded data error correction is judged to be not possible.

In the ECC processor 68 of this embodiment, when an error correction is judged to be not possible as explained above, a C2PO error flag is set, indicating that the error correction of the EFM-decoded data is not possible. In the ECC processor 68 shown in this figure, the C2PO error signal SE output according to the C2PO error flag is transmitted to the system controller 11 via the controller interface 69.

The system controller 11 is formed so t hat it makes a disc check for judging whether or not data is recorded on the target disc properly according to the received C2PO error signal SE in the disc check mode.

The controller interface 69 is provided to transmit/receive control signals and other various information signals to/from the system controller 11 shown in FIG. 2.

Furthermore, audio data, after its errors are corrected in the ECC processor 68, is output from the register 70 via the output controller 71. This output audio data is written in the buffer memory 13 under the control of the memory controller shown in FIG. 2.

<4. Operation in disk check mode>
(4.a. First example)

Figure 5:
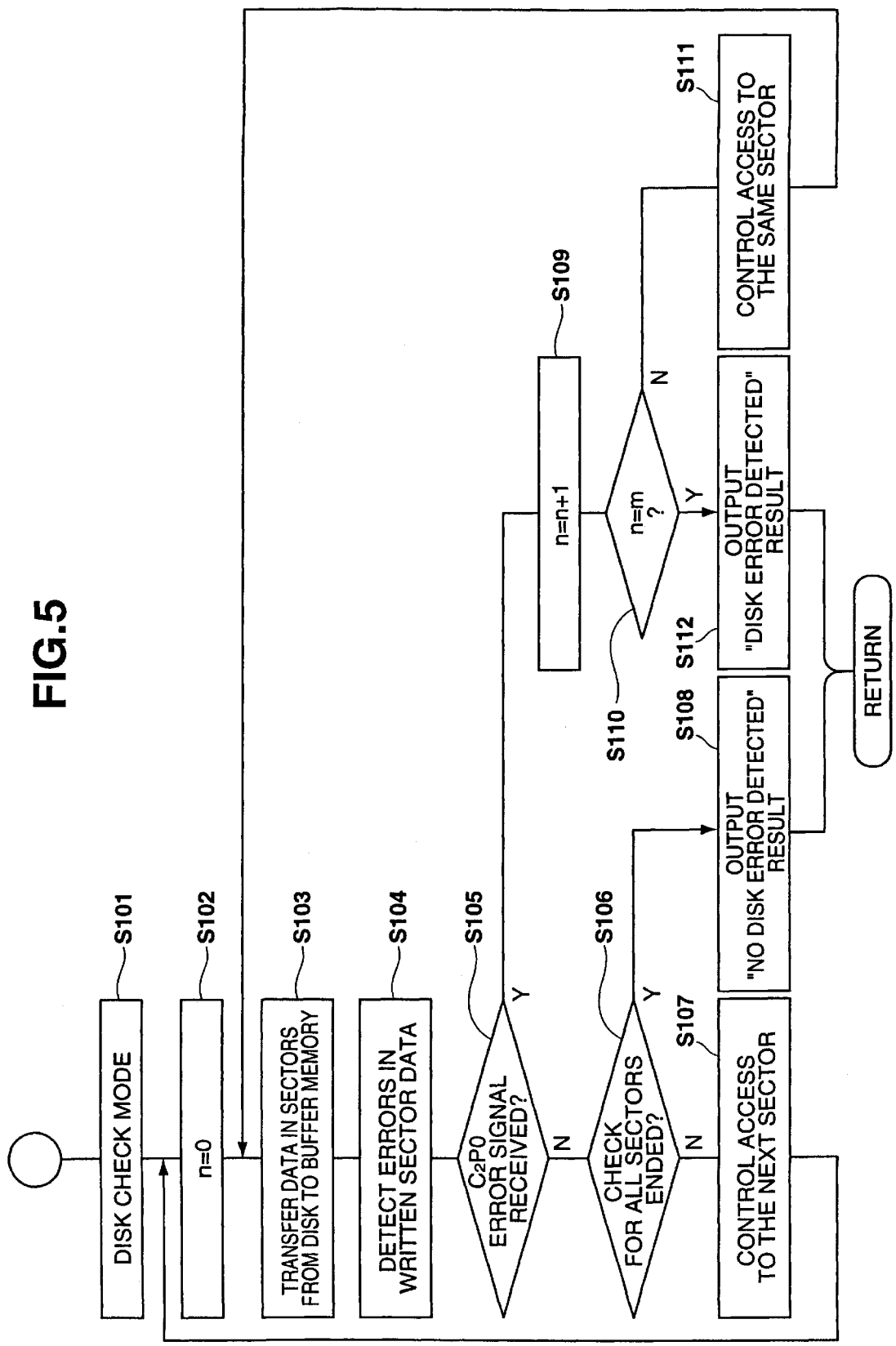
FIG. 5 is a flow chart explaining a processing in the fist embodiment in the error check mode.

Hereunder, the first operation example in the disc check mode in this embodiment will be explained with reference to the flow chart shown in FIG. 5. The flow chart shown in FIG. 5 explains a processing of the system controller 11 in this disc check mode.

When the user executes a specified operation to make the record & playback apparatus in the disc check mode, the processing of the system controller 11 goes to step S101 to set the disc check mode. In step S102, the variable n indicating the number of retry to be explained later is set as n=0, then the processing goes to step S103.

In step S103, a playback control is executed to read out data from the disc 1. In this case, the data is read out from the disc 1 in sectors sequentially (see FIG. 3B) and written in the buffer memory 13.

In the following step S104, the system controller 11 controls so that an error detection is executed for each data written in the buffer memory 13 in sectors. This error detection processing is executed in the ECC processor 68 provided in the decoder of the EFM/ACIRC encoder and decodes 8 as explained above.

In disc check mode, the data written in the buffer memory 13 as explained above is not supplied to the compressed audio data encoder & decoder 14. In other words, in the disc check mode, the compressed audio data encoder & decoder 14 does not execute the processing of expanding the data read out from the disc 1 and outputting the data as audio signals.

Thus, it is not necessary to read out the data intermittently from the disc 1 at the timing as in an ordinary playback for which the data transfer rate (0.3 Mbits/sec) on the compressed audio data encoder & decoder 14 is taken into consideration. The data can therefore be read out continuously or intermittently at a timing faster than that in an ordinary playback. Consequently, it takes less time to read out a certain volume of data than in an ordinary playback. As a result, the disc checking time can be reduced significantly.

In step S105 subsequent to the step S104, it is judged whether or not the C2PO error signal SE (see FIG. 4) is transmitted to the system controller 11 from the ECC processor 68. The error signal SE indicates the error detected in sector data in step S104 is not correctable. When it is judged that the system controller 11 does not receive the C2PO error signal SE, the sector data is determined to be recorded on the disc properly. Thus, the process goes to step S106.

In step S106, it is judged whether or not data check for every recorded sector of the disc 1 is ended. In this step, when it is specified so that every data on the disc 1 is to be checked in the disc check mode operations, it is judged whether or not data check for every recorded sector is ended. While, for example, when it is specified so that data check is to be made in tracks, it is judged whether or not error detection is made for all the sectors forming every target track for which a disc check is specified.

When it is judged that there is still a sector left for which an error detection must be made in step S106, the processing goes to step S107 to control accessing to the disc 1 so that data is read out from the start of the next sector. Then, the processing returns to the processing in step S102.

On the contrary, when it is judged that error detection is ended for all the target sectors in step S106, the processing goes to step S108.

In step S108, the result of disc check is output which indicates that no read out error (hereinafter referred to as "disc error") caused by improper recorded data is detected. In this embodiment, control is performed so that, for example, the display is made on the display unit 20 as an output to show that no disc error is detected as explained above.

By looking at the display on the display unit 20 the user can know that every data or each sector data is recorded on the target disc properly in the disc check mode.

The form of the display is not limited specially here, so that no further specific explanation thereof will be made.

Furthermore, when it is judged in step S105 that the ECC processor 68 has transmitted the C2PO error signal S$_E$, the processing goes to the processing in or after step S109.

In step S109, at first the variable n is increased to n=n+1. And, in the following step S110, it is judged whether or not the variable n has reached the preset number m (n=m). This preset number m corresponds to the limit of the number of retries to be executed as explained below. For example, when the preset number of retries is taken as L, the present number m is expresses as m=L−1.

When it is judged that n is not to be n=m in step S110, the processing goes to step S111 to execute control for accessing to the start of the same sector that was read out from the disc in step S103. After the processing in step S111, the processing goes to step S103 to read out the data of the same sector from the disc again and execute an error detection processing from step S104. This is a retry operation in the disc check mode.

The reason why the retry operation is executed in such manner in this embodiment is that a detected uncorrectable error is not caused by improperly recorded data on the disc (a disc error), but by a great potential of improper data playing back of the playback system due to a disturbances of some kind in the reading & playback apparatus, and repeating of the above retry operation may enable the above playback system to be stabilized, so that data can be read properly.

Consequently, the preset number m may be set arbitrarily by taking the number of the above retries enough to restore the proper read operation into consideration.

When it is judged that the variable n has reached the preset number m (n=m) in step S110, the processing goes to step S112 with a determination that a disc error has occurred.

In step S112, the system controller 11 executes control so that the result of detecting the disc error is displayed as a result of the disc check. Looking at the display, the user, for example, can know that data is not recorded properly on the target disc on which the disc check is performed and there will be a high possibility of abnormality where the audio signals will not be output continuously when in actual the recorded data of the disc is output as audio signals.

After ending the control of outputting the disc check result in step S112 or S108, the process flow goes out from this routine to complete the disc check mode.

(4.b. Second example)

Subsequently, the second operation example in the disc check mode in this embodiment will be explained.

In the above-mentioned first disc check mode operation, when detection of a disc error is once determined, a data read out operation is made to be ended after a result of detecting the disc error is output.

On the contrary, in second disc check mode operation, even when a result of disk error detection is obtained once, the read operation is continued to complete the error detection for all the target disc data (sectors). And, each detected disc error can be output together with the error site information.

FIG. 6 is a flow chart indicating a processing of the system controller 11 in the second disc check mode. In the routine shown in FIG. 6, the processings in steps S201, S203 to S208, and S212 to S214 are the same as those in steps S101, S102 to S107, and S109 to S111 shown in FIG. 5. Thus, explanation for those steps is omitted here.

When the disc check mode is set in step S201 in this case, the variable E corresponding to the number of disc error detections becomes E=0. Then, the processing goes to step S203.

When it is judged that the C2PO error signal is received from the ECC processor 68 in step S206 after the processings in steps S203 to S206, the processing increases the variable n in step S212, then goes to step S213.

In this second disc check mode, when a disc error occurrence in the target sector is determined in step S213 by ending the preset number of the retry operations with n=m, the processing goes to step S215 to increase the variable E, then goes to step S207. Consequently, data is read out from the disc until the error detecting operation for every target disc data (all sectors) is ended even when a disc error is detected in a certain sector halfway.

Furthermore, in this second disc check mode, when it is judged that the error detecting processing for every sector of the target disc is ended in step S207, the processing goes to step S209 to judge whether the variable E indicating the number of the disc error detection is E≧1, that is, whether or not a disc error is detected at least once in the disc check executed so far.

When it is judged that the variable E is not E≧1, the system controller 11 executes control so as to display that no disc error is detected. On the contrary, when it is judged that the variable E is E≧1, the system controller 11 executes control so as to display that the disc error is detected. In this case, in addition to the display of the result of disc error detection, information on the number of disc error sites and the sites where the disc errors are detected, and so on can be displayed according to information with respect to the variable E. Here, the form of displaying those items is not limited specially also in this example.

The present invention is not limited to only the configurations of the embodiment explained so far. For example, in the above embodiment, the system controller 11 is explained as that using the C2PO error signal S$_E$ to judge disc errors. However, the system controller 11 may also be made to judge occurrence of disc errors with reference to the error rate that is obtained more exactly, for which the system controller 11 also takes in a signal corresponding to information of the flag that is set according to the result in the error detecting processing in the ECC processor 68 for, for example, C1 error requesting double correction or C2 error requesting quadruple correction.

Furthermore, the above embodiment is explained on the condition that the rotation speed of the disc 1 in the disc check mode is one time just like in an ordinary playback. However, data may be read from the disc 1 at the speed double the specified one, control of the data writing or reading in or from the buffer memory 13 and the data processing operation of the decoder of the EFM/ACIRC encoder and decoder 8 may also be performed according to the clocks corresponding to this double read speed, since no consideration is necessary for properly outputting playing back audio signals as explained above. In such a case, the disc checking time can be reduced more significantly.

Furthermore, the present invention can be also applied to various data playback apparatuses other than the mini-disc system mentioned above. Especially, in a playback apparatus to which recording media with compressed data being recorded thereon is applicable, the present invention will be more useful, since disc checks can be made using the data in a stage before being expanded.

As explained above, according to the present invention, whether or not data is recorded properly on the target recording medium can be judged by using the information of error detection obtained in an error correction processing for the data read out from the recording medium. Consequently, the judgment becomes more accurate than, for example, when the user oneself judges according to the audio signals, and so on obtained by actually playing back the data recorded on the target recording medium.

Furthermore, when compressed data is recorded on the target recording medium, the above judgment can be made by using the information of the error detection obtained by an error correction processing executed for compressed data before it is expanded. Consequently, the result of the judgment is obtained faster than, for example, in the case where it is confirmed with audio signal and so on actually played back from the recording medium. Usually, in the case of a mini-disc, data can be recorded for up to a maximum of 74 minutes. Therefore, it takes a whole 74 minutes in a conventional error check executed after the data is expanded. In the present invention, however, error checks can be made for compressed; and that the error check is completed within about 15 minutes.

What is claimed is:

1. An error checking apparatus that judges whether or not compressed data is recorded properly on a recording medium, comprising:

means for instructing error check mode;
   means for reading out compressed data recorded on said recording medium; and
   means for detecting an error according to an error correction code, said error correction code being added to said compressed data read out from said recording medium,
   when said error check mode is instructed by said instructing means, said reading out means reading out said compressed data and said error detecting means executing an error detecting operation, so that whether or not said compressed data is recorded properly on said target recording medium is judged according to information of detected error obtained by said error detecting means to execute error checks for as-compressed data.

2. A method of checking an error, wherein whether or not compressed data is recorded properly on a target recording medium is judged, said method comprising of steps of:

instructing error check mode;
   reading out compressed data recorded on said target recording medium; and
   detecting an error according to an error correction code, said error correction code being added to compressed data read out from said recording means,
   when said error check mode is instructed in said instructing step, said compressed data being read out in said reading out step and said error being detected in said error detecting step, so that whether or not said compressed data is recorded properly on said target recording medium is judged according to information of detected error to execute error checks for as-compressed data.

3. A method of checking recording error in compressed data recorded on a recording and/or reproducing medium, comprising the steps of:

initializing a variable;
   sequentially reading compressed data in a sector from said medium and writing said read data in a memory;
   determining whether an error signal is detected in said sector;
   if an error signal is detected, increasing said variable by one and determining whether said increased variable equals a predetermined limit;
   if said increased variable equals said predetermined limit, displaying an error flag;
   if said increased variable is less than said predetermined limit, determining again whether an error signal is detected in said sector; and
   if an error signal is not detected, displaying a no-error flag.

4. The method of claim 3 wherein said step of initializing said variable includes setting said variable to zero.

5. The method of claim 3 wherein said predetermined limit indicates the maximum number times it is determined whether an error signal is detected in said sector.

6. The method of claim 3 wherein said error flag includes sector information of said compressed data where said error signal is detected.

7. A method of checking recording error in compressed data recorded on a recording and/or reproducing medium, comprising the steps of:

initializing a variable;
   sequentially reading in sectors compressed data in sectors from said medium and writing said data in a memory;
   for each sector of compressed data:
      determining whether an error signal is detected in said sector, wherein;
         if an error signal is detected, increasing said variable by one and determining whether said increased variable equals a predetermined limit, wherein;
            if said increased variable equals said predetermined limit, generating an recording error signal corresponding to the sector of compressed data having said detected error signal;
            if said increased variable is less than said predetermined limit, determining, for the compressed data in said same sector, whether an error signal is detected;
         if an error signal is not detected, generating a no-recording error signal corresponding to the sector of the compressed data having no error signal; and
      displaying said recording error signal or said no-recording error signal.

8. The method of claim 7 wherein said step of initializing said variable includes setting said variable to zero.

9. The method of claim 7 wherein said predetermined limit indicates the maximum number of repeating said step of determining whether an error signal is detected in each sector.

10. The method of claim 7 wherein said recording error signal includes sector information of said compressed data where said error signal is detected.

11. The method of claim 10 wherein said step of displaying displays sector information of all compressed data where said error signal is detected.

* * * * *